Patented May 31, 1938

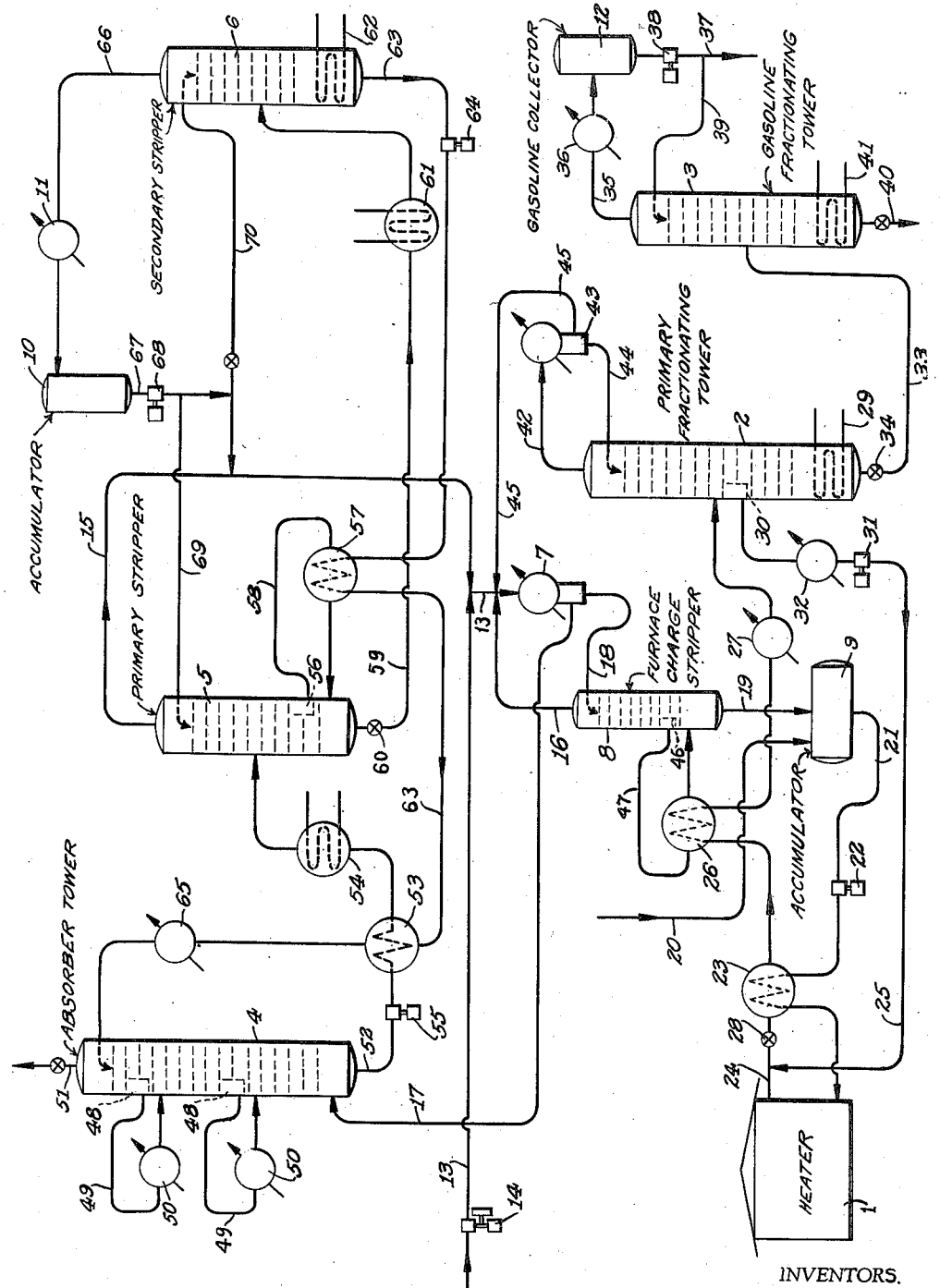

2,118,822

UNITED STATES PATENT OFFICE 2,118,822

CONVERSION OF HYDROCARBONS

George W. Robinson, Houston, Tex., and George Roberts, Jr., Montclair, N. J., assignors to The Polymerization Process Corporation, Jersey City, N. J., a corporation of Delaware Application June 15, 1937, Serial No. 148,276

4 Claims. (Cl. 196—10)

This invention relates to the production of normally liquid hydrocarbons including gasoline or motor fuel constituents from normally gaseous hydrocarbons. Particularly, the invention relates to a process for effecting the polymerization or conversion of hydrocarbon gases such as those produced in oil-cracking operations or from natural gas sources to hydrocarbons of lower-boiling point suitable for use as motor fuel.

Normally gaseous hydrocarbons, preferably after the removal of hydrogen and methane and excessive quantities of ethane, may be treated to convert a substantial proportion thereof to normally liquid products by means of a single-stage operation wherein the gases are heated to a temperature of 750° to 1250° F. at pressures in excess of 400 pounds per square inch, or by heating them to higher temperatures for longer periods under lower pressure, or by heating them at lower temperatures and at lower pressure, if desired, in the presence of suitable catalysts. The products of such conversion operations, which may be the result of polymerization or related reactions, include hydrogen, normally gaseous hydrocarbons, and normally liquid hydrocarbons including those which form constituents of gasoline.

In carrying out such a conversion operation the conversion products are ordinarily fractionated to produce a normally gaseous fraction and a normally liquid fraction. The normally liquid fraction is removed for treatment to recover gasoline therefrom, and the normally gaseous fraction is further fractionated to recover any hydrocarbons suitable for further conversion treatment. These hydrocarbons are combined with similar hydrocarbons from an extraneous source and subjected therewith to further conversion treatment.

This invention contemplates admixture of hydrocarbon gases from any suitable source with the normally gaseous fraction separated from the gas conversion products and treatment of the mixture to obtain therefrom a charging stock of superior quality and to recover from such gases substantially all the constituents suitable for conversion operations. The invention further contemplates the further treatment of gases from which a charging stock has been separated, including scrubbing of the gases by means of a liquid absorbent medium to separate therefrom convertible gaseous hydrocarbons by absorption in the scrubbing medium, the stripping of absorbed gases from the scrubbing medium and their admixture with the gases undergoing the above-mentioned treatment for the preparation of a charging stock. It is an object of the invention to produce an improved operating method and cycle for carrying out a recycling type of gas conversion process wherein the various operations are carried out in a combination of steps having a minimum apparatus requirement and wherein the various steps are correlated to obtain efficient recovery of convertible constituents from gases introduced to the system from an extraneous source and from gases produced in the system to prepare a charging stock of superior quality substantially free from non-convertible constituents by simple means and with minimum expenditure of energy.

The invention contemplates the treatment of a stream of normally gaseous hydrocarbons derived from oil-cracking operations, or from natural gas sources, in a cooling and condensing zone to separate therefrom a liquid fraction predominating in the relatively high-boiling normally gaseous hydrocarbons suitable for conversion, such as $C_3$ and $C_4$ hydrocarbons, and introducing into said zone simultaneously for treatment with the said stream gaseous constituents of the conversion products and convertible constituents separately recovered from unliquefied gases from said zone as hereinafter described. The cooling and condensing zone may be provided by a suitable condenser including cooling means and means for separating liquefied gases from those which are unliquefied. The invention provides, in conjunction with the cooling and condensing zone, a separate stripping zone wherein the liquids separated in the cooling and condensing zone are stabilized to strip therefrom light gases undesired or unsuitable for conversion operation. The gases stripped from the liquids in this furnace charge stripping zone may be introduced into the cooling and condensing zone for treatment therein simultaneously with the other gases introduced into this zone to effect recovery of desired convertible constituents therefrom which are returned to the furnace charge stripping zone with the other liquids separated in the cooling and condensing zone.

The liquefied hydrocarbons thus stabilized are passed to suitable conversion treatment to effect conversion of at least a portion thereof to normally liquid hydrocarbons. They must be passed to a suitable heating means wherein they are subjected to elevated conditions of temperature and pressure, optionally in the presence of catalysts, to effect the conversion reaction, for example, by heating them to a temperature of 750° to 1250° F. at a pressure of 400 to 3000 pounds per square inch.

The conversion products on emerging from the conversion reaction zone are cooled by the admixture therewith of a stream of normally liquid hydrocarbons containing dissolved therein relatively heavy normally gaseous hydrocarbons such as $C_3$ and $C_4$ hydrocarbons to effect cooling of the reaction products to prevent the conversion reactions from proceeding too far. The mixture of products of conversion and cooling liquid are then fractionated to separate therefrom a normally liquid fraction and a normally gaseous fraction. The normally liquid fraction is further fractionated to recover therefrom a gasoline fraction, this fractionation operation being carried out alone or in conjunction with the fractionation of similar liquid hydrocarbons from another source. A portion of the normally liquid constituents of the mixture of conversion products and cooling liquid, after separation therefrom of relatively light hydrocarbons, but while still containing relatively heavy normally gaseous hydrocarbons such as $C_3$ and $C_4$ hydrocarbons, is withdrawn from the fractionating zone to serve as the cooling medium for the conversion products on their emergence from the conversion reaction zone.

The normally gaseous fraction is passed to the above-mentioned cooling and condensing zone wherein separation of the lighter gases such as fixed gases including hydrogen and methane and the lighter hydrocarbons undesired for conversion such as ethane is effected together with the separation of the correspondingly light gases contained in the streams of hydrocarbons introduced into the cooling and condensing zone from other sources.

The unliquefied gases separated in the cooling and condensing zone are withdrawn therefrom and passed through a scrubbing zone in intimate contact with a liquid absorbent medium such as gas oil to recover from the gases convertible constituents contained therein by absorption in the liquid absorbent medium. The gases emerge from the scrubbing zone impoverished of convertible constituents and are withdrawn from the system for use elsewhere, for example, as fuel.

The enriched liquid absorbent medium is withdrawn from the scrubbing zone and stripped of the normally gaseous hydrocarbons dissolved therein in two stages. In the first stage the enriched liquid absorbent medium is heated at a relatively high pressure to effect a separation therefrom of the relatively light gases including those undesired for conversion as well as some gaseous hydrocarbons suitable for conversion treatment. In the second stage the partly impoverished liquid absorbent medium is maintained and/or heated at a lower pressure to strip therefrom the remaining gaseous hydrocarbons which include those hydrocarbons most suitable for conversion treatment and most amenable to liquefaction such as the $C_3$ and $C_4$ hydrocarbons. The gases separated in the second stage of the stripping action are liquefied, and portions thereof may be returned to the first and second stripping stages as reflux to assist in maintaining the proper temperature conditions therein.

The remainder of the liquefied hydrocarbons from the second stripping stage is admixed with gases passing to said cooling and condensing zone and may be admixed with gases separated in the first stage. The mixture of liquids and gases is passed to the above-mentioned cooling and condensing zone to assist in recovery of convertible constituents therein. The two-stage stripping of the gases from the enriched absorbent medium permits efficient recovery of absorbed hydrocarbons from the liquid with a minimum expenditure of energy and minimum requirement for equipment. The impoverished liquid absorbent medium is returned to the scrubbing zone for reuse therein.

The treatment of the gaseous hydrocarbons from the stripping zones, the fractionating zone and the furnace charge stripping zone in the cooling and condensing zone together with the hydrocarbon gases from an extraneous source permits the treatment of all the gases introduced to or produced in the system to separate therefrom charging material, in a single cooling and condensing zone, making possible simplification of the operation of the process and the carrying out of the process with a minimum requirement for apparatus.

Aside from efficiency in the stripping operation the production of an easily condensible gaseous stream in the second stripping stage is advantageous in that it permits the introduction of some liquefied gas into the cooling and condensing zone together with the gases so introduced whereby liquefaction of the desired constituents is more easily accomplished.

The invention will be further described with reference to the accompanying drawing which illustrates the invention and in which the figure is a diagrammatic view in elevation of apparatus suitable for carrying out the invention. It will be understood, however, that the invention is capable of other embodiments and is not limited by the specific apparatus illustrated.

In the drawing a heater 1, fractionators 2 and 3, an absorber tower 4, strippers 5 and 6, a condenser 7, a furnace charge stripper 8, accumulators 9 and 10, a cooler 11, and a gasoline collector 12 are indicated together with auxiliary equipment for carrying out the process of the invention.

Referring to the drawing, a stream of normally gaseous hydrocarbons derived from oil-cracking operations such as gases separated from a high-pressure separator or from a stabilizer or both or from natural gas sources is introduced into the system through line 13 which is provided, if necessary, with a compressor 14. From line 13 the gaseous stream is introduced into a condenser 7 after admixture with streams of normally gaseous hydrocarbons from lines 45, 15, and 16. In condenser 7 the hydrocarbons introduced therein are cooled to separate therefrom a liquid fraction predominating in the hydrocarbons most suitable for conversion treatment such as the $C_3$ and $C_4$ hydrocarbons. The uncondensed gases are withdrawn from condenser 7 through line 17 and introduced thereby into the lower portion of absorber tower 4. The liquid fraction separated in condenser 7 is withdrawn therefrom through line 18 and introduced into the upper portion of a furnace charge stripper 8.

In furnace charge stripper 8 the liquids introduced therein are heated to strip therefrom gases undesired for conversion treatment whereby a stabilized furnace charge consisting substantially entirely of hydrocarbons most suitable for conversion treatment is produced. The gases stripped from the said liquefied hydrocarbons pass from the top of the furnace charge stripper 8 through line 16 and are introduced thereby into line 13 for admixture with gases to be introduced into condenser 7 for further treatment for the separation of convertible constituents in liquefied form.

The stabilized furnace charge is withdrawn from furnace charge stripper 8 through line 19 and introduced thereby into an accumulator 9. Additional furnace charge suitably prepared from an external source may be introduced into accumulator 9 through line 20. The furnace charge is withdrawn from accumulator 9 through line 21 and passed for conversion treatment to heater 1 by means of a pump 22 located in line 21 and after being preheated by passage through a heat exchanger 23 in indirect contact with the conversion products.

In the heater 1 the normally gaseous hydrocarbons charged thereto are subjected to elevated conditions of temperature and pressure to effect conversion of at least a portion of the normally gaseous hydrocarbons to normally liquid hydrocarbons, for example, by polymerization reactions. The gases may be heated at a temperature of 750° to 1250° F. under a pressure of 400 to 3000 pounds per square inch, or they may be heated to higher temperatures for longer periods under lower pressure. Specifically, they may be heated to a temperature of 1030° F. at a pressure of 1200 pounds per square inch.

The conversion reaction products emerge from the heater 1 through line 24 and are cooled substantially to inhibit further conversion to products heavier than desired by the admixture therewith in line 24 of a stream of relatively cool normally liquid hydrocarbons containing dissolved therein heavier normally gaseous hydrocarbons such as $C_3$ and $C_4$ hydrocarbons, which are introduced into line 24 through line 25. The mixture is then further cooled by passage through heat exchanger 23 in indirect contact with the incoming charge and through heat exchanger 26 and, if desired, cooler 27, and then introduced into a primary fractionating tower 2. The pressure on the mixture may be reduced before passage through heat exchanger 23 if desired; a valve 28 being provided in line 24 for that purpose.

In the primary fractionating tower 2 conditions of temperature and pressure are maintained to effect separation of normally gaseous constituents from normally liquid constituents. For example, a pressure of 425 pounds per square inch may be maintained with a bottom temperature of 465° F., and a top temperature of 150° F. The normally liquid hydrocarbons descend to the bottom of the tower 2 and are heated by heating means 29 to the temperature necessary to strip from the liquids the normally gaseous hydrocarbons undesired therein. A trap-out tray 30 may be provided at an intermediate point in the primary fractionating tower 2 below the point of introduction of the products of conversion to collect a portion of the normally liquid hydrocarbons containing dissolved therein normally gaseous hydrocarbons of relatively high boiling point such as the $C_3$ and $C_4$ hydrocarbons. Line 25 connects with trap-out tray 30 for withdrawing the liquids collected therein and conducting them to admixture with the hot products of conversion, as described above. A pump 31 is provided in line 25 to effect transfer of the liquids, and a cooler 32 may be provided to cool the liquids to the desired degree before admixture with the hot products of conversion.

The liquids collected in the bottom of primary fractionating tower 2 are permitted to flow therefrom through line 33 by a reduction in pressure afforded by valve 34 in line 33. The line 33 connects with an intermediate point in a gasoline fractionating tower 3 wherein conditions of temperature and pressure are maintained to strip from the liquids the gasoline constituents contained therein. For example, the tower 3 may be maintained at atmospheric pressure with a bottom temperature of 450° F. and a top temperature of 200° F. The gasoline vapors ascend the tower and are withdrawn from the upper portion thereof through line 35, which is provided with a cooler 36 whereby the vapors are condensed. The resulting liquids are introduced into a gasoline collector 12 and are withdrawn therefrom through line 37 provided with a pump 38 and are thus withdrawn from the system for further treatment elsewhere, if desired. A portion of the gasoline from collector 12 may be diverted from line 37 through line 39 for return to the upper portion of gasoline fractionating tower 3 as reflux to effect control of the temperature in the tower. The heavy liquids stripped of gasoline collect in the bottom of tower 3 and are withdrawn therefrom through line 40 for treatment elsewhere. Heating means 41 may be provided in the bottom of tower 3 to maintain the temperature in the liquids therein necessary to effect stripping of the gasoline constituents therefrom.

It is apparent that the function of the primary fractionating tower 2 and the gasoline fractionating tower 3 could be performed by a single structure provided with suitable connections and cooling means. However, for purposes of illustration of the process of the invention separate towers are shown. It is evident that the liquid products of the process of the invention withdrawn from the bottom of tower 2 could be withdrawn from the system and subjected to fractionation elsewhere in connection with similar liquids from other sources.

The normally gaseous constituents separated in the primary fractionating tower 2 ascend the tower and are withdrawn therefrom through line 42 and are introduced thereby into condenser 43 wherein the gases are cooled to effect a partial condensation and a separation of a liquid fraction. The liquid fraction is withdrawn from condenser 43 through line 44 and returned to the upper portion of primary fractionating tower 2 as reflux to effect control of the temperature in the top of that tower. It is evident that other cooling means may be provided, however, in place of or supplementary to the reflux means disclosed. The uncondensed gases separated in condenser 43 are withdrawn therefrom through line 45 and are introduced into condenser 7. This may be done by connecting line 45 with line 13 whereby the gases from condenser 43 are admixed with the stream of hydrocarbon gases being introduced to the system through line 13 prior to the passage of these gases into the condenser 7 for the separation of the furnace charge.

Condenser 7 and furnace charge stripper 8 may be maintained conveniently at a pressure only slightly less than that of primary fractionating tower 2 so that with a pressure of about 425 pounds in tower 2 condenser 7 and stripper 8 may be maintained at a pressure of about 400 pounds per square inch. The gases introduced into condenser 7 through line 13 and consisting of gases introduced to the system as fresh feed and of gases separated from the products of conversion of gases from furnace charge stripper 8 and of gases introduced from the recovery system through line 15 may be cooled to condense therefrom the greater portion of the heavier normally gaseous hydrocarbons desired for conversion such as $C_3$ and $C_4$ hydrocarbons. To this end, at a pressure of about 400 pounds per square inch, they may be cooled to a temperature of 80° F. to effect partial liquefaction and to separate a liquid fraction predominating in convertible constituents. This liquid fraction, which may include a substantial proportion of gases undesired for conversion, is introduced into the furnace charge stripper 8 through line 18 and is therein stabilized as a preliminary to conversion by having stripped therefrom substantially all the gases undesired for conversion. This may be done by heating the liquids in the stripper 8 to the temperature necessary to effect the removal of the undesired constituents. At a pressure of 400 pounds per square inch a bottom temperature of 150° F. is sufficient for this purpose. The furnace charge stripper 8 may be provided with trays, bubble caps and other gas and liquid contact means to facilitate separation of convertible constituents from those undesired for that use, by causing intimate contact of descending liquids and ascending gases stripped from the liquids.

The liquids in stripper 8 conveniently may be heated by heat exchange with the products of conversion passing through line 24. A trap-out tray 46 may be provided in stripper 8 to collect a portion of the descending liquids. A line 47 connecting with the trap-out tray 46 and passing through heat exchanger 26 and back to the stripper 8 at a point below the trap-out tray 46 may be provided to circulate the liquid collected in trap-out tray 46 in indirect heat exchange with the products of conversion passing through heat exchanger 26.

The stripping of undesired light gases from the liquid in furnace charge stripper 8 may result in the passage overhead with them of a certain proportion of heavier, convertible constituents. The gases withdrawn from furnace charge stripper 8 through line 16 are therefore recirculated through cooler 7 by introducing the gases into line 13 to effect recovery of a portion of the constituents therein desired for conversion.

The gases uncondensed in condenser 7 are withdrawn therefrom through line 17 and introduced into the lower portion of an absorber tower 4 in which they ascend in countercurrent flow with a descending stream of liquid absorbent medium which conveniently may be gas oil or lighter, such as gasoline. Trays, bubble caps and other gas and liquid contact means may be provided in absorber tower 4 to effect intimate contact of the gases and liquids, and temperature and pressure conditions are maintained to effect substantially complete absorption by the liquid absorbent medium of constituents desired for conversion remaining in the gases passing through absorber tower 4. This may involve the collateral absorption of a certain amount of undesired light gases, but these may be disposed of as described below. The absorber tower 4 conveniently may be operated at a pressure substantially the same as the furnace charge stripper 8, that is, about 400 pounds per square inch, and a temperature of approximately 100° F. may be maintained throughout the absorber tower 4 to effect the desired absorption. To maintain the temperature of the liquids at the desired low maximum in spite of the heat developed by absorption, cooling means may be provided intermediate the ends of absorber tower 4 to effect cooling of a portion of the descending liquid. For example, trap-out trays 48 may be provided to collect portions of the descending absorbent medium, and lines 49 provided with coolers 50 and located externally of the absorber tower 4 are provided to circulate the liquid collected in the trap-out trays 48 through coolers 50, to effect a reduction in temperature of the liquids, and back to the absorber tower 4 at points below the points of withdrawal. The gases, after passage through the absorber tower 4, are withdrawn from the upper portion thereof substantially impoverished of convertible constituents through line 51 and are withdrawn from the system for treatment elsewhere, for example, as fuel oil.

The enriched absorbent medium collects in the bottom of absorber tower 4 and is withdrawn therefrom through line 52 and passed to a primary stripper 5. Primary stripper 5 is maintained under conditions of temperature and pressure to effect separation of the lighter normally gaseous hydrocarbons dissolved in the absorbent medium together with any fixed gases. These lighter normally gaseous hydrocarbons include those undesired for conversion as well as a certain proportion of the $C_3$ and $C_4$ hydrocarbons desired for conversion treatment. As a preliminary to introduction of the enriched absorbent medium into primary stripper 5 the liquid may be preheated by passage through heat exchanger 53 and heating means 54 located in line 52. The primary stripper 5 may be maintained at a pressure substantially the same as or slightly greater than that maintained in absorber tower 4, for example, about 400 to 425 pounds per square inch. A pump 55 may be provided in line 52 to effect the transfer of the enriched absorbent medium from absorber tower 4 to primary stripper 5.

To effect the desired separation in primary stripper 5 at a pressure of about 400 to 425 pounds per square inch the liquid may be heated to a temperature of approximately 300° F. prior to introduction into the stripper, and a bottom and top temperature of 400° F. and 150° F., respectively, may be maintained. The bottom temperature may be maintained by suitable heating means for heating the liquids which collect in the bottom of primary stripper 5. This may be accomplished by withdrawing a portion of the descending liquid absorbent medium from the stripper 5, heating it and returning it to the bottom of the stripper. For example, a trap-out tray 56 may be provided to collect a portion of the descending liquid. Heat exchanger 57 located externally of the stripper 5 may be provided, and a line 58 may be provided for withdrawing the liquid collected in trap-out tray 56, circulating it through heat exchanger 57 and back to stripper 5 at a point below trap-out tray 56 to effect a rise in temperature of the liquids so circulated.

The gases stripped from the absorbent medium in primary stripper 5 ascend to the top of the stripper and are withdrawn therefrom through line 15 and returned for treatment in condenser 7 through line 15 which connects with line 13 whereby a substantial proportion of the gaseous constituents desired for conversion are recovered by liquefaction in condenser 7.

The partially impoverished liquid absorbent medium is withdrawn from the bottom of primary stripper 5 through line 59 by means of a reduction in pressure afforded by valve 60 located in valve 59. The partially impoverished liquid absorbent medium passing through line 59 may be raised in temperature somewhat by passage through heating means 61 located in line 59 and is then introduced into a secondary stripper 6. In secondary stripper 6 conditions of temperature and pressure are maintained to effect removal of substantially all gaseous constituents from the liquid absorbent medium. For example, a pressure of about 150 pounds per square inch may be maintained with a bottom temperature of 550° F. and a top temperature of 120° F. The liquid may be heated to a temperature of 430° F. prior to introduction into secondary stripper 6, and heating means 62 may be provided in the bottom of secondary stripper 6 to maintain the desired temperature in the liquid which collects at that point.

The impoverished liquid absorbent medium is withdrawn from secondary stripper 6 through line 63 by means of pump 64 in line 63 and returned to the top of absorber tower 4 after being cooled by passage through heat exchangers 57 and 53 and, if necessary, cooler 65 is located in line 63.

The gases stripped from the liquid absorbent medium in secondary stripper 6 ascend to the upper portion thereof and are withdrawn therefrom through line 66 which is provided with a cooler 11. Inasmuch as the gases stripped from the absorbent medium in stripper 6 consist of the relatively easily condensible relatively heavy normally gaseous hydrocarbons, they may be completely liquefied by passage through cooler 11. The liquefied gases are introduced into an accumulator 10 from line 66 from which they may be withdrawn by means of line 67 provided with a pump 68 to form a part of the furnace charge. This may be done conveniently by connecting line 67 with line 15 whereby the liquefied hydrocarbons are admixed with the gaseous hydrocarbons withdrawn from the upper portion of primary stripper 5 and whereby the gases from various sources introduced into condenser 7 through line 13 have admixed therewith prior to such introduction a substantial proportion of liquefied normally gaseous hydrocarbons whereby liquefaction of a portion of such gases in condenser 7 is more easily accomplished. Furthermore, the admixture of the liquefied hydrocarbons with the predominant light gases in line 15 assist in the recovery of the heavier constituents of those gases by absorption in the liquefied hydrocarbons introduced through line 67. Portions of the liquefied hydrocarbons from accumulator 10 may be diverted from line 67 through lines 69 and 70 to primary stripper 5 and secondary stripper 6, respectively, for use as reflux in effecting the maintenance of the desired temperature in the upper portions of these strippers.

Primary strippers 5 and 6 are provided with trays or bubble caps or other gas and liquid contact means to facilitate intimate contact of the liquids and gases contained in the respective chambers to facilitate the desired separation of the constituents therein. It is evident that these strippers may be combined in a single structure but for purposes of illustration of the process of the invention and to simplify presentation of the subject matter the primary stripper 5 and secondary stripper 6 are shown as detached structures.

Similarly, primary fractionating tower 2 and gasoline fractionating tower 3 may be provided with trays or bubble caps or other gas and liquid contact means to facilitate stripping, absorption, condensation and evaporation incidental to fractionation.

The present invention provides a conversion process having minimum requirements as to apparatus wherein the various steps are correlated to effect substantially complete recovery of convertible constituents from the gases under treatment and maximum efficiency in subjecting such convertible constituents to conversion treatment and the recovery of the products of conversion. The invention has been illustrated with reference to a specific modification. It is evident, however, that the invention is capable of other modifications and is not limited by the said illustrations.

We claim:

1. The method of converting normally gaseous hydrocarbons to normally liquid hydrocarbons which comprises introducing a gaseous stream of normally gaseous hydrocarbons under pressure into a cooling and condensing zone whereby a liquid fraction predominating in the relatively high-boiling normally gaseous hydrocarbons such as $C_3$ and $C_4$ hydrocarbons is obtained, passing said liquid fraction to a separatory zone, heating said liquid fraction in said separatory zone to strip therefrom relatively low-boiling normally gaseous hydrocarbons undesired for conversion treatment, withdrawing said stripped liquid fraction from said separatory zone, subjecting said withdrawn liquid fraction to elevated conditions of temperature and pressure to effect conversion of at least a portion thereof to normally liquid hydrocarbons, introducing the products of said conversion into a fractionating zone, maintaining said fractionating zone under conditions of temperature and pressure to separate therein normally gaseous constituents from normally liquid constituents including gasoline constituents, passing gases separated in said fractionating zone to said cooling and condensing zone, passing gases separated in said separatory zone to said cooling and condensing zone, withdrawing uncondensed gases and vapors from said cooling and condensing zone, passing said uncondensed gases and vapors through a scrubbing zone, introducing a liquid absorbent medium into said scrubbing zone and into intimate contact with said gases and vapors passing therethrough whereby convertible constituents such as the relatively high-boiling normally gaseous hydrocarbons are dissolved in said liquid absorbent medium, withdrawing enriched liquid absorbent medium from said scrubbing zone, stripping and recovering normally gaseous hydrocarbons from said removed enriched liquid absorbent medium, and introducing said recovered normally gaseous hydrocarbons into said cooling and condensing zone.

2. The method according to claim 1 wherein the enriched absorbent medium withdrawn from the scrubbing zone is passed successively through a high-pressure stripping zone and a low-pressure stripping zone, gases recovered in the low-pressure stripping zone are liquefied, part of the liquefied gases is introduced to the stripping zones as reflux, the remainder of the liquefied gases is admixed with the gases recovered in the high-pressure stripping zone, and the resulting mixture is passed to the cooling and condensing zone.

3. The method according to claim 1 wherein the products of conversion are passed in heat exchange with a part of the liquids in the separatory zone to effect stripping of relatively low-boiling hydrocarbons from the latter.

4. The method according to claim 1 wherein the enriched absorbent medium withdrawn from the scrubbing zone is passed successively through a high-pressure stripping zone and a low-pressure stripping zone, gases recovered in the low-pressure stripping zone are liquefied and at least a portion of the said liquefied gases is admixed with the gases introduced into said cooling and condensing zone prior to said introduction.

GEORGE W. ROBINSON.
GEORGE ROBERTS, Jr.